US012749940B2

(12) United States Patent
Eilebrecht et al.

(10) Patent No.: US 12,749,940 B2
(45) Date of Patent: Sep. 29, 2026

(54) ROTOR FOR AN ELECTRIC MACHINE

(71) Applicant: Voith Patent GmbH, Heidenheim (DE)

(72) Inventors: Philipp Eilebrecht, Heidenheim (DE); Michael Weckert, Aalen (DE); Bernd Heinrich, Oellingen (DE); Stefan Veser, Böhmenkirch-Treffelhausen (DE)

(73) Assignee: Voith Patent GmbH, Heidenheim (DE)

( * ) Notice: Subject to any disclaimer, the term of this patent is extended or adjusted under 35 U.S.C. 154(b) by 197 days.

(21) Appl. No.: 18/809,813

(22) Filed: Aug. 20, 2024

(65) Prior Publication Data

US 2024/0413695 A1 Dec. 12, 2024

Related U.S. Application Data

(63) Continuation of application No. PCT/EP2023/053591, filed on Feb. 14, 2023.

(30) Foreign Application Priority Data

Feb. 21, 2022 (DE) ..................... 10 2022 103 999.4

(51) Int. Cl.
*H02K 3/51* (2006.01)
*H02K 1/26* (2006.01)
*H02K 1/28* (2006.01)

(52) U.S. Cl.
CPC ................. *H02K 3/51* (2013.01); *H02K 1/26* (2013.01); *H02K 1/28* (2013.01)

(58) Field of Classification Search
CPC .. H02K 3/51; H02K 1/26; H02K 1/28; H02K 17/22

(Continued)

(56) References Cited

U.S. PATENT DOCUMENTS 5,635,785 A 6/1997 Schwanda et al.
2013/0038166 A1 2/2013 Cifyildiz et al.
(Continued)

FOREIGN PATENT DOCUMENTS

CN 202475072 U 10/2012
CN 204243955 U 4/2015
(Continued)

OTHER PUBLICATIONS

CN204243955U English translation (Year: 2026).*
(Continued)

*Primary Examiner* — Christopher M Koehler
*Assistant Examiner* — Viswanathan Subramanian
(74) *Attorney, Agent, or Firm* — TAYLOR & EDELSTEIN, PC

(57) ABSTRACT

A rotor for an electric machine includes: a rotor body; winding elements; and a winding head, which includes a winding head support and retaining elements, each of which includes a tension bolt and a support body, wherein the support bodies are arranged at least partially in a radial direction outside of the winding elements, wherein the tension bolt penetrates the support body associated therewith and is screwed into the winding head support by a thread, wherein each of the retaining elements includes a stop surface for coming into contact with the winding head support when screwing in the tension bolts in order thereby to adjust a radial length with which the tension bolts protrude from the winding head support to a predefined dimension, and wherein the predefined dimension is calculated so that the support bodies are not pressed against the winding elements in a resting position of the rotor.

6 Claims, 2 Drawing Sheets

(58) Field of Classification Search
USPC .......................................................... 310/270
See application file for complete search history.

(56) References Cited

U.S. PATENT DOCUMENTS

| | | | | |
|---|---|---|---|---|
| 2013/0187493 | A1* | 7/2013 | Henning .................. | H02K 3/51 310/194 |
| 2021/0359569 | A1* | 11/2021 | Hildinger ................. | H02K 3/38 |

FOREIGN PATENT DOCUMENTS

| | | | |
|---|---|---|---|
| DE | 701 612 | C | 1/1941 |
| DE | 10 2010 020 415 | A1 | 11/2011 |
| DE | 10 2018 129 677 | B3 | 12/2019 |
| DE | 10 2019 118 625 | A1 | 1/2021 |
| EP | 0 826 261 | B1 | 11/1999 |
| JP | 56-88639 | A | 7/1981 |

OTHER PUBLICATIONS

German Office Action dated Jan. 26, 2023 for German Patent Application No. 10 2022 103 999.4 (6 pages).
Notification of the Transmission of the International Search Report and Written Opinion of the International Search Authority or Declaration dated May 26, 2023 for International Application No. PCT/EP2023/053591 (12 pages).

* cited by examiner

ROTOR FOR AN ELECTRIC MACHINE

CROSS REFERENCE TO RELATED APPLICATIONS

This is a continuation of PCT application no. PCT/EP2023/053591, entitled "ROTOR FOR AN ELECTRIC MACHINE", filed Feb. 14, 2023, which is incorporated herein by reference. PCT application no. PCT/EP2023/053591 claims priority to German patent application 10 2022 103 999.4, filed Feb. 21, 2022, which is incorporated herein by reference.

BACKGROUND OF THE INVENTION

1. Field of the Invention

The present invention relates to a rotor for an electric machine.

2. Description of the Related Art

DE 10 2010 020 415 A1 discloses a rotor that is suitable for a variable-speed hydroelectric power motor-generator. The rotor disclosed in this document includes winding elements which are arranged in axial grooves of a rotor body, a winding head which is arranged axially adjacent to the rotor body, and a winding head support, wherein the winding head is connected to the winding head support by way of tension bolts. The tension bolts engage at their radial outer ends with support bodies, which in turn rest on the winding elements in the region of the winding head. Each winding element is thus held by two tension bolts by way of one support body per tension bolt in the region of a winding head. When tightening the tension bolts, the problem arises that due to the force exerted on the winding elements they could be bent slightly inwards. This could result in that, when tightening the second tension bolt of a relevant winding element, the previously tightened associated tension bolt is no longer under sufficient tension and could therefore loosen over time due to the vibrations that occur during operation.

What is needed in the art is an arrangement with which the aforementioned problem can be avoided.

SUMMARY OF THE INVENTION

The present invention relates to a rotor for an electric machine, in particular for a rotor-driven slip ring rotor machine, as are being used for variable speed hydroelectric power motor-generators for pumped storage power stations.

The following items form part of the present disclosure:

Item 1. A rotor (1) for an electric machine, including a rotor body (2), a multitude of winding elements (3), and a winding head arranged axially adjacent to the rotor body (2), wherein the winding elements (3) are arranged in axially progressing grooves of the rotor body (2), and wherein the winding head includes a winding head support (4) and a multitude of retaining elements (5), and wherein each retaining element (5) respectively includes a tension bolt (6) and a support body (7), and wherein the support bodies (7) are arranged at least partially in radial direction outside of the winding elements (3), and wherein the tension bolts (6) respectively penetrate an associated support body (7) and are screwed into the winding head support (4) by wat of a thread, characterized in that, the retaining elements (5) respectively includes a stop surface (8), which is designed in such a way that it can come into contact with the winding head support (4) when screwing in the tension bolts (6), in order to thereby adjust the radial length with which the tension bolts (6) protrude from the winding head support (4) to a predefined dimension, wherein the predefined dimension is calculated so that the support bodies (7) are not pressed against the winding elements (3) in a resting position of the rotor (1).

Item 2. The rotor (1) according to item 1, wherein a respective retaining element (5) includes an elastic element (9) which is arranged in a space between associated support body (7) and winding elements which are held by the respective retaining element.

Item 3. The rotor (1) according to items 1 or 2, wherein the stop surface (8) is formed by a step of the tension bolt (6).

Item 4. The rotor (1) according to items 1 or 2, wherein a respective retaining element (5) includes a sleeve (10), and wherein the tension bolt (6) penetrates the sleeve (10), and wherein the stop surface (8) is formed by an end of the sleeve (10), which is oriented towards winding head support (4).

Item 5. The rotor (1) according to item 4, wherein the tension bolt (6) includes a step (11) which can be pressed against the sleeve (10) when the tension bolt (6) is tightened.

Item 6. The rotor (1) according to items 1 or 2, wherein the support body (7) includes a sleeve-like protuberance, and wherein the stop surface (8) is arranged at an end of the protuberance.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
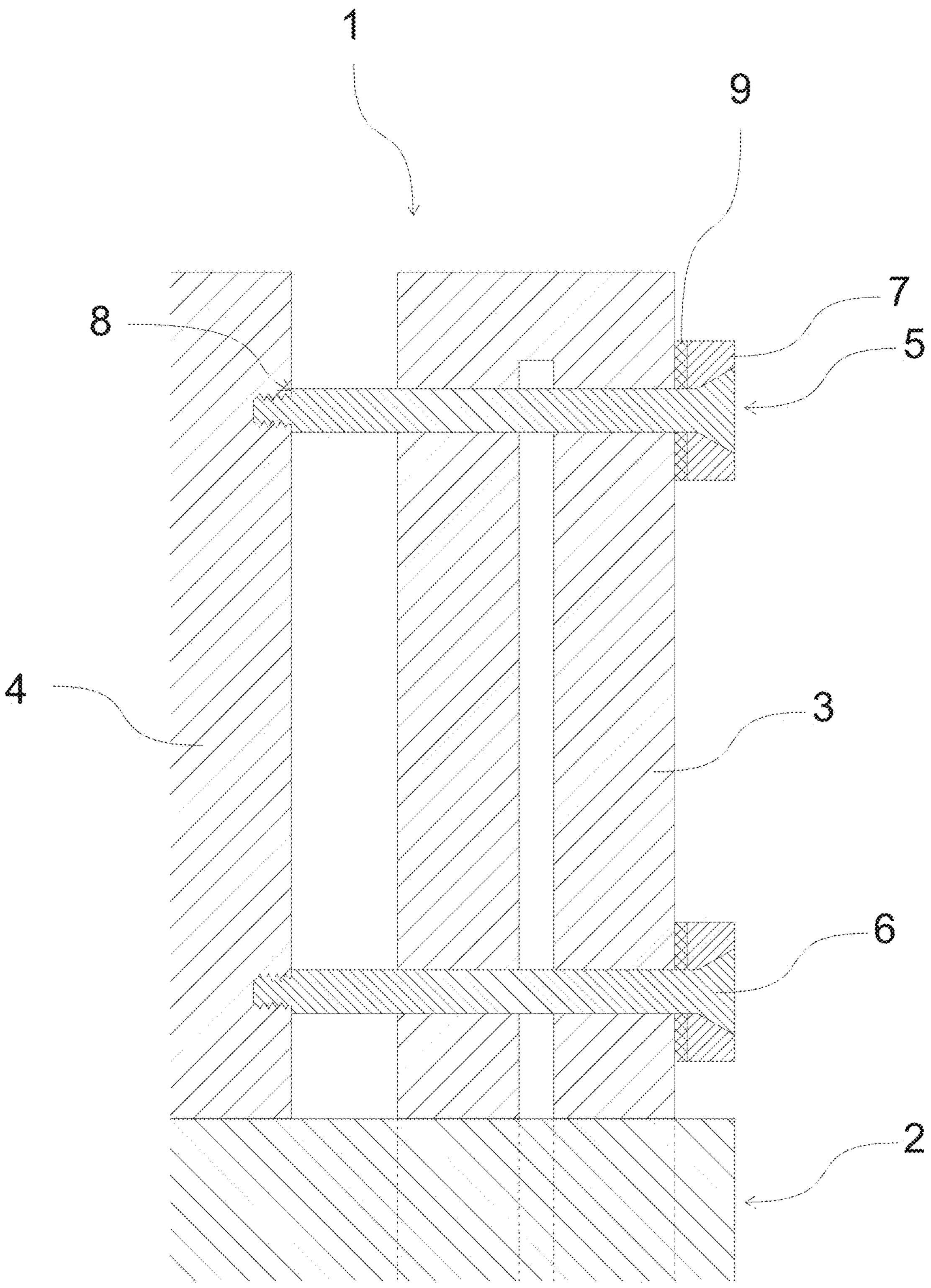
FIG. 1 is a rotor according to the invention.

FIG. 1 is a schematic representation of a rotor according to the present invention. Only a section of the rotor is shown in FIG. 1. The rotor is identified as 1. Rotor 1 includes a rotor body which is designated 2, and a multitude of winding elements arranged in axially progressing grooves of rotor body 2. The winding elements thereby form two layers in radial direction. The winding elements protrude in radial direction beyond rotor body 2 and thus form a so-called winding head, which is arranged axially adjacent to rotor body 2. In each case, a winding element of one layer is connected at its end with the end of a winding element of the other layer. In FIG. 1, a winding element is identified as 3.

So that winding elements 3 are not bent radially outwards by the enormous centrifugal forces occurring during the operation of the electric machine, they must be held in their position in the region of the winding head. For this purpose, the winding head includes a winding head support, which is identified as 4 in FIG. 1, and a multitude of retaining elements, one of which is identified as 5 in FIG. 1. Each retaining element 5 includes a tension bolt and a support body. In FIG. 1, one of the tension bolts is identified as 6 and one of the support bodies is identified as 7. Support bodies 7 are arranged in radial direction outside winding elements 3. Tension bolts 6 each penetrate corresponding support body 7 and are screwed into winding head support 4 by way of a thread. Winding head support 4 can also consist of several parts, so that tension bolts 6 are for example screwed into profile strips which are arranged in corresponding grooves of the winding head support body. Profile strips and winding head support bodies are then parts of winding head support 4.

According to the present invention, retaining elements 5 include a stop surface 8, which is designed in such a way that it can come into contact when screwing tension bolts 6 to winding head support 4, in order to adjust the radial length with which tension bolts 6 protrude from winding head support 4 to a predefined dimension. The predefined dimension is calculated so that support bodies 7 are not pressed against winding elements 3 in the resting position of rotor 1. This means that, in the resting position of rotor 1, support bodies 7 ideally just touch winding elements 3 when tension bolts 6 are screwed into winding head support 4 until stop surface 8 comes into contact with winding head support 4. Alternatively, there may also be a (small) space between support body 7 and winding elements 3 in the aforementioned position.

The characteristic "that support bodies 7 are not pressed against winding elements 3 in the resting position of rotor 1" is to be understood herein to mean that the compressive force transmitted to winding elements 3 by tightened tension bolts 6 in the resting position of rotor 1 is negligible compared to the tensile force acting in tightened tension bolts 6. This is the case if the compressive force transmitted to winding elements 3 by a tightened tension bolt 6 is less than 15% of the tensile force acting in respective tension bolt 6.

On the one hand, stop surfaces 8 designed in this way prevent winding elements 3 from being deformed when tension bolts 6 are screwed in. On the other hand, they ensure that the screw connection between tension bolt 6 and winding head support 4 is tensioned so that the screw connection cannot come loose during operation of rotor 1. High pre-tensioning of tension bolts 6 also means that the additional force acting on tension bolts 6 during operation is small compared to the pre-tensioning force, which extends the service life of tension bolts 6.

Optionally, retaining elements 5 may include an elastic element which is arranged in the space between associated support body 7 and winding elements 3 which are held by respective retaining element 5. In FIG. 1, such an elastic element is identified as 9. Elastic elements 9 are designed in such a way that they are pressed together slightly in radial direction when tension bolts 6 are screwed in until corresponding stop surfaces 8 come into contact with winding head support 4. The elasticity module of elastic elements 9 is therein to be selected herein in such a way that, when they are pressed together, no significant deformation of winding elements 3 can occur. In other words, elastic elements 9 are designed in such a way that no significant deformation of winding elements 3 can occur when tension bolts 6 are screwed in until the corresponding stop surfaces 8 come into contact with winding head support 4.

Figure 2A:
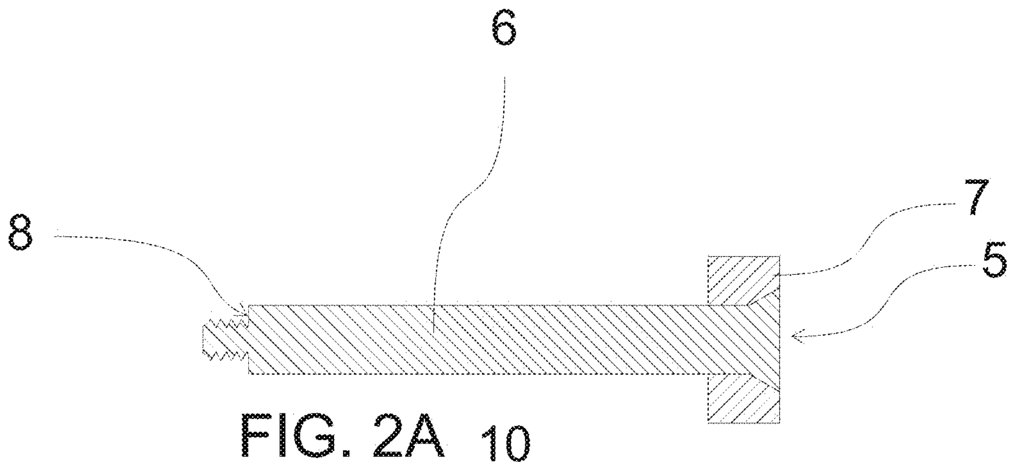
FIGS. 2A, 2B, 2C, 2D are embodiments of the retaining assembly according to the invention.
Figure 2B:
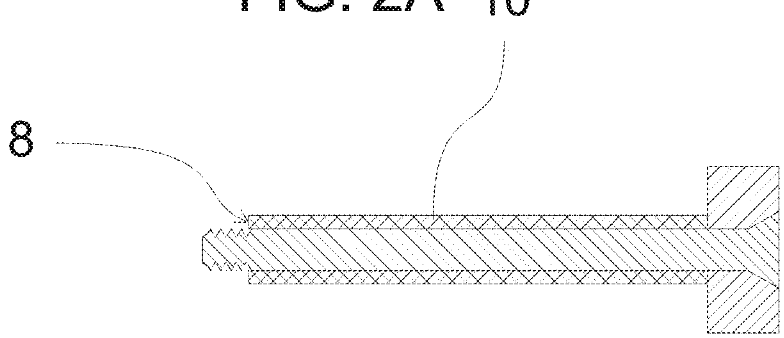
Figure 2C:
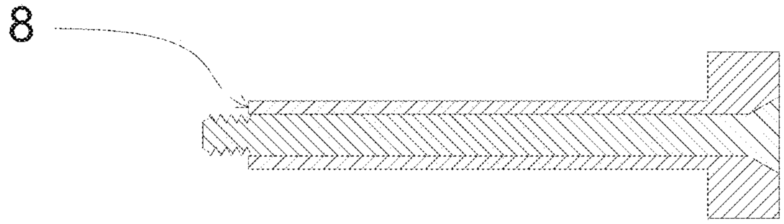

FIGS. 2A, 2B, 2C, 2D show various embodiments of inventive retaining elements 5. In the embodiment demonstrated in FIG. 2A, stop surface 8 is formed by a step of tension bolt 6. In the next embodiment, which is shown in FIG. 2B, retaining element 5 includes a sleeve identified as 10. Tension bolt 6 penetrates sleeve 10, and stop surface 8 is formed by the end of sleeve 10, which is oriented towards winding head support 4. In the next embodiment, which is shown in FIG. 2C, support body 7 includes a sleeve-like protuberance, wherein stop surface 8 is arranged at the end of the protuberance. In the latter embodiment, support bodies 7 are only partially arranged in a radial direction outside of winding elements 3, since the sleeve-shaped protuberance of same extends between winding elements 3. This protuberance can also serve to support the winding elements which are retained by the respective retaining element in lateral direction. An additional embodiment results by combining the latter two embodiments by combining a shorter sleeve 10 with a correspondingly shorter protuberance of support body 7.

Figure 2D:
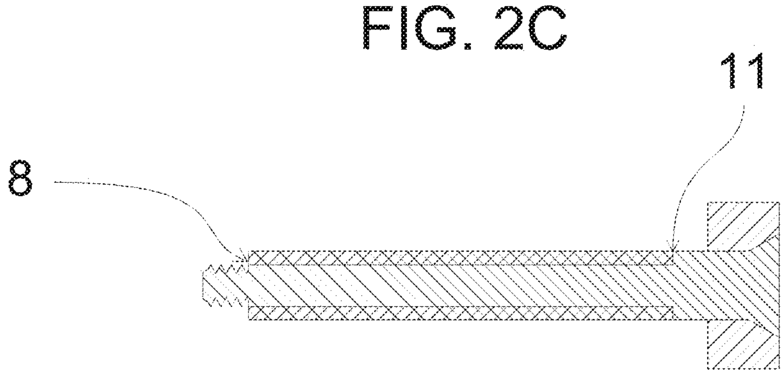

Stop surface 8 is herein formed by the end of sleeve 10. In the lower embodiment, which is shown in FIG. 2D, tension bolt 6 includes a step, which is identified as 11 and which presses against a sleeve 10 when tension bolt is screwed in. Here too, stop surface 8 is provided by the end of sleeve 10. The advantage of this embodiment is that support body 7 is extensively relieved. Further embodiments result from the use of several sleeves 10 per tension bolt 6, whereby sleeves 10 are pressed against each other when screwing in associated tension bolt 6.

COMPONENT REFERENCE LISTING

1. Rotor
2. Rotor body
3. Winding element
4. Winding head support
5. Retaining elements
6. Tension bolts
7. Support body
8. Stop surface
9. Elastic element
10. Sleeve
11. Step While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotor for an electric machine, the rotor comprising:

a rotor body, which includes a plurality of grooves which are axially progressing;

a plurality of winding elements, which are arranged in the plurality of grooves;

a winding head, which is arranged axially adjacent to the rotor body and includes a winding head support and a plurality of retaining elements, wherein each of the plurality of retaining elements respectively includes a tension bolt and a support body such that the plurality of retaining elements includes a plurality of the tension bolt and a plurality of the support body, wherein the plurality of the support body are arranged at least partially in a radial direction outside of the plurality of winding elements, wherein the tension bolt respectively penetrates the support body associated therewith and is screwed into the winding head support by way of a thread, wherein each of the plurality of retaining elements respectively includes a stop surface which is configured for coming into contact with the winding head support when screwing in respectively the plurality of the tension bolt in order thereby to adjust a radial length with which the plurality of the tension bolt protrude from the winding head support to a predefined dimension, and wherein the predefined dimension is calculated so that the plurality of the support body are not pressed against the plurality of winding elements in a resting position of the rotor.

2. The rotor according to claim 1, wherein a respective one of the plurality of retaining elements includes an elastic element which is arranged in a space between a respective one of the plurality of the support body and a respective one of the plurality of winding elements which are associated with and are held by the respective one of the plurality of retaining elements.

3. The rotor according to claim 1, wherein the tension bolt includes a step, and wherein the stop surface is formed by the step of the tension bolt.

4. The rotor according to claim 1, wherein a respective one of the plurality of retaining elements includes a sleeve including an end, and wherein the tension bolt penetrates the sleeve, and wherein the stop surface is formed by the end of the sleeve, the end of the sleeve being oriented towards the winding head support.

5. The rotor according to claim 4, wherein the tension bolt includes a step which is configured for being pressed against the sleeve when the tension bolt is tightened.

6. The rotor according to claim 1, wherein the support body includes a sleeve-like protuberance which is sleeve-like and includes an end, and wherein the stop surface is arranged at the end of the protuberance.

* * * * *